2,543,390

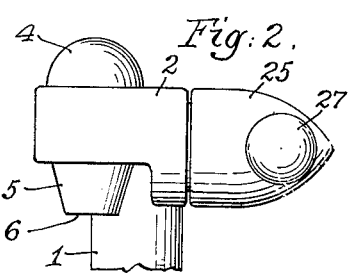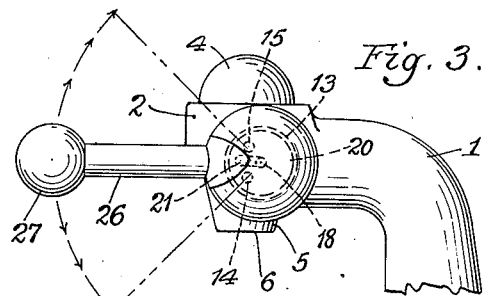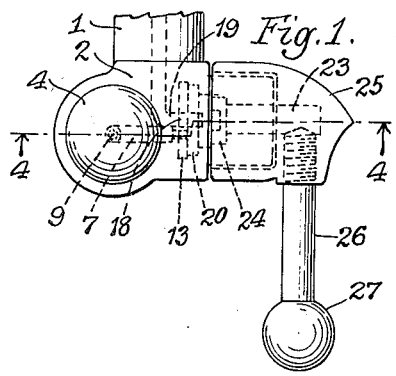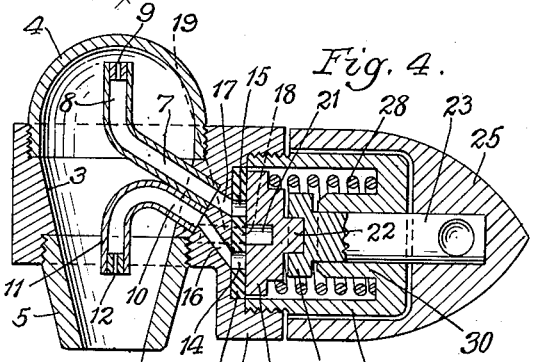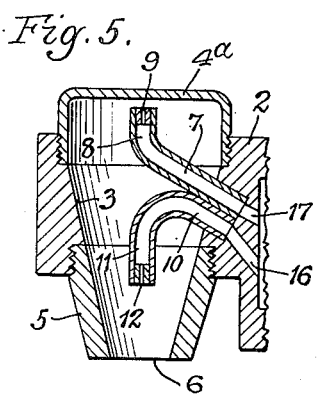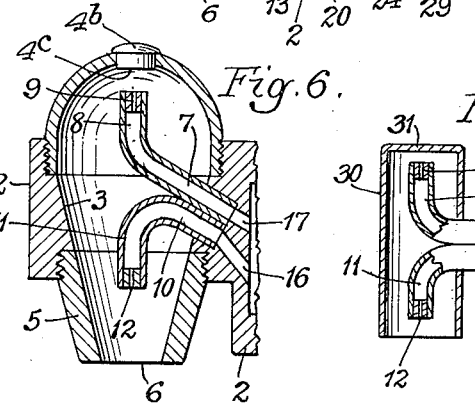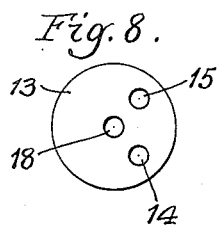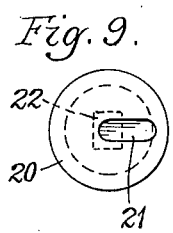
Inventors
Paul D. Van Vliet
Bartell J. Homkes
by Parker & Carter
Attorneys Patented Feb. 27, 1951

UNITED STATES PATENT OFFICE 2,543,390

DRAFT ARM FOR CARBONATED BEVERAGES

Paul D. Van Vliet and Bartell J. Homkes, Galesburg, Ill., assignors to Liquid Carbonic Corporation, Chicago, Ill., a corporation of Delaware Application May 17, 1944, Serial No. 535,908

3 Claims. (Cl. 222—129)

This invention relates to an improvement in draft arms for soda fountains and the like, or for dispensing beer, or any carbonated beverage, and has for one purpose to effect an improvement in the carbonated water supply to soda fountain beverages.

Another purpose is to provide a draft arm, and means for delivering carbonated water thereto, in which turbulence is avoided or largely reduced during pressure reduction and delivery to the glass.

Another purpose is to provide a draft arm effective to maintain a maximum saturation of the final beverage with $CO_2$.

Another purpose is to provide a simple efficient draft arm and carbonated liquid delivery assembly.

Another purpose is to provide means for simultaneously delivering carbonated water, and a flavoring syrup.

Other purposes will appear from time to time in the course of the specification and claims.

The invention is illustrated more or less diagrammatically in the accompanying drawings wherein;

Figure 1 is a top elevation of the draft arm structure;

Figure 2 is a front elevation;

Figure 3 is a side elevation;

Figure 4 is a section on the line 4—4 of Figure 1;

Figure 5 is a similar partial section illustrating a variant structure;

Figure 6 is a similar partial section illustrating a further variant structure;

Figure 7 is a still further partial section illustrating a further variation in structure; and Figures 8 and 9 are details.

Like parts are indicated by like symbols throughout the specification and drawings.

Referring to the drawings, 1 generally indicates the main draft arm structure which extends to any suitable source of supply and may for example be extended to and supported on any suitable soda fountain housing not herein shown in detail and not of itself forming part of the invention.

It will be understood that any suitable passage element may be employed for delivering carbonated water, under suitable pressure, from any suitable carbonator, not shown. 2 generally indicates any suitable draft arm body mounted on, or forming part of, and in communication with the interior of the draft arm 1. It is shown as having an intermediate wall 3 extending about and assisting in defining a delivery chamber. 4 is an upper member or dome screw threaded or otherwise secured to the body 2 and forming the upper portion of the mixing and delivery chamber. It is shown in Figure 4 as generally spherical or domed. 5 indicates a constricted delivery member. It will be observed in Figure 4 that the inner surfaces of the members 4 and 5 are continuous with the inner surface 3 of the body 2 and define a chamber which has a domed top and a conic downwardly and inwardly restricted intermediate and bottom portion terminating in the bottom lip 6. 7 is a delivery passage for delivering carbonated water under pressure. It is shown as having a generally vertical upward extension 8 with an orifice 9 in the end to produce a jet, shown as located on the central axis of the head formed by the members 2, 4, and 5. It will be understood that it is effective to deliver a jet of carbonated water against the inner surface of the top of the dome 4. 10 is a second delivery passage having a downwardly turned end 11 aligned with the axis of the head and having an orifice or jet delivering aperture member 12 at its lower end, adapted to deliver a jet or so called needle stream of carbonated water through the bottom delivery aperture defined by the lip 6. 13 is an apertured gasket having apertures or ports 14, 15 aligned with the body ports 16, 17 which communicate with the ducts 10 and 7 respectively. 18 is a supply port shown at the center of the gasket and in communication with any suitable supply port 19 in the body 2, extending to any suitable source from which carbonated water, under suitable pressure, may be delivered. 20 is a rotatable tumbler having an aperture or passage 21 which is always in alignment with and in communication with the supply ports 18 and 19. The passage 21 is shown in Figure 9 as located in neutral position. When in that position carbonated water, while ready for delivery, is not delivered to either passage 7 or 10. It will be understood that if desired any suitable means may be employed, not herein shown, for delivering uncarbonated water through and from the arm 1 and past the discharge 6 of the head structure. The tumbler is shown as having a non-circular or irregular projection 22 which interpenetrates with a stem 23 inwardly headed as at 24 and secured in and rotatable by the cap 25. The cap 25, in turn is provided with an actuating stem 26 terminating in any suitable manual abutment or manual operating ball 27. When the ball 27 is moved upwardly, referring to the position in which the parts are shown in Figure 3, the tumbler will be rotated by the stem 23 and the passage 21 will be rotated into alignment with the ports 15, 17. Carbonated water under pressure will thereupon be delivered along the ducts 7, 8 and through the aperture 9 for impingement against the inner surface of the dome 4 of the head. If the members 26, 27 are moved downwardly, referring to the position of the part in Figure 3, the duct 21 of the tumbler will be rotated into alignment with the ducts 14, 16 and carbonated water under pressure will be delivered along the passage 10, 11 and through the aperture jet 12 which serves as a needle spray means.

A spring 28 bears on the tumbler 20 at one end and holds the tumbler against the gasket 13. A cup shaped retainer 29 is screw threaded into the body 2 and encloses the spring 28 and tumbler 20. The retainer 29 has a bearing portion 39 for the stem 23.

Referring to Figure 5, the structure is the same as shown in Figure 4 except that for the dome 4 a flattened member 4a is substituted.

Referring to Figure 6 the same structure is shown except for the insertion of a separate abutment 4b having a flat bottom surface 4c aligned with the elements 8 and 9.

Figure 7 shows a somewhat different form of head in which a cylinder 30 is employed having a generally flat top 31 aligned with the members 8 and 9.

Our device is also adaptable to deliver at the same time carbonated water from the upper orifice 9 and a syrup from orifice 12, thus effecting a mixing of the beverage in one operation. In such case a separate source of syrup under pressure, a separate supply tube from that source to the draft head and orifice 12, and a valve mechanism effective to permit flow of both liquids coincidentally to their respective orifices when operating handle is moved, are used.

Still another application is the drawing of beer, in which case the duct 10, orifice 12 and valve port 14 are omitted.

It will be realized that whereas we have shown and described a practical and operative device, nevertheless many changes may be made in the size, shape, number and disposition of parts without departing from the spirit of the invention. We therefore wish our description and drawings to be taken as in a broad sense illustrative or diagrammatic, rather than as limiting us to our precise showing.

The use and operation of the invention are as follows:

Carbonated water as supplied to soda fountain draft arms is ordinarily at high pressure, and in delivering it to the glass a large portion of the $CO_2$ is lost. The present invention relates to reducing the pressure on the carbonated water from the relatively high supply pressure to atmospheric pressure in such a manner as to permit a higher $CO_2$ content in the glass and to permit using a supply at lower carbonator pressure and $CO_2$ content than is customary or necessary with the usual draft arms of prior practice. A more palatable drink, higher in $CO_2$, is thus obtained, with an economy in the $CO_2$ gas used and also in the equipment required. $CO_2$ dissolves in water in amounts directly proportional to pressure and inversely proportional to temperature. If fully carbonated at pressures of 100 pounds and 75° F., the amount of gas dissolved will be six volumes. This may be cooled to, say 40° F. with no change in the gas content. But when the pressure is reduced to atmospheric in the draft arm head or chamber, the water is supersaturated with gas, and is in unstable equilibrium, because water at 0 gauge and 40° F. will hold only 1.45 volumes in stable solution. The excess gas comes out of the solution to form bubbles. This evolution of bubbles is not instantaneous. Under conditions of water agitation, the action is fast, and the less turbulent the stream during pressure reduction and delivery to the glass, the slower is the emission of the gas from the carbonated water. If turbulence can be avoided or largely reduced during pressure reduction and during delivery to the glass, much of the excess gas will remain in the carbonated water.

In dispensing drinks, there may be an ounce or more of uncarbonated syrup in the glass, which is intimately mixed with the carbonated water at drawing. This reduces the concentration of $CO_2$ in the mixed drink below that of the carbonated water. Unless the water is delivered to the glass in a highly supersaturated condition, the drink is below the $CO_2$ content required for maximum palatability. Thus avoidance of turbulence at the time of pressure reduction and delivery makes available more gas in the drink.

In the structure herein shown turbulence is avoided by reducing pressure through a single orifice of a size to give the required rate of flow, the jet being directed toward and against a flat surface, with the purpose of expending the energy of the jet, in friction by causing an abrupt 90° change in direction of flow. In the various forms of the device herein shown there is the common feature that the flow, when the jet strikes the abutment, is radial from the point of jet contact. This 90° change in direction results in the radial spreading of a thin layer of water moving outwardly from the point of impingement of the jet, and across the actual abutment area toward the circumferential side wall of the draft arm.

In the form of Figure 4 this thin layer of water takes a gradual change of direction in conformity with the spherical inner surface of the member 4 and there is no sudden change of direction. To collect and direct the outwardly and downwardly flowing water, the abutment area is centrally located in relation to the inner collecting surface of the member 4 of Figure 4; similarly the abutment area is centrally located in the form of Figures 5, 6 and 7. The collecting surface directs the water to the downwardly extending wall of the intermediate portions 3 and 5 of the draft arm with the conical bottom section shown in Figures 4, 5 and 6. The water is confined and directed downwardly to a suitably sized exit opening defined by the lip 6. The result is a relatively quiet flow to the glass. The flattening of the member 4a of Figure 5 does not in practice have any substantial effect on the lack of turbulence thus obtained. The separate abutment element 4b of Figure 6 does not change the operation of the device but merely provides a wear taking element or a corrosion resisting element which may be of different characteristics than the rest of the collecting surface and may, under some circumstances, be advantageously formed for removal and replacement.

The carbonated water is supersaturated at the instant it leaves the orifice 9, at 0 pressure, but gas is largely retained because turbulence is so wholly confined to the point of impact of the jet with the abutment, and for so short a period of time for any particular particle of water, that only slight bubble formation occurs. In later flow over the collecting surface the water flows as a rapidly moving film without turbulence, and any bubbles of gas which escape to the space within do not upset or change the character of the solid film of rapidly moving water. The flow of water to the glass, is in practice, nearly transparent, indicating that the supersaturated condition at the jet is substantially maintained throughout delivery to the glass.

Thus, by using the various structures shown herein, it is possible to get a higher $CO_2$ content in the final drink than is obtainable from any existing draft arm. It will be understood that a wide variety of forms of collecting surfaces is available, any one of those shown herein having proved, in practice, to be practicable.

The parts are relatively simple. The orifice 9 is nonclogging, as are the ducts themselves, since they are larger than any possible particles in city water supplies. The spacing of the orifice from the opposed abutment may vary over wide limits, and no adjustment of distance between the orifice and the abutment surface is required or provided. The abutment element 4 may be formed as a separate member, of Stellite or other hard material that will not be eroded by silt in the jet. However, this is a matter of design which does not effect the operation of the device. Either a cup or a cone may form the collecting body. Or the inverted cup may be omitted and a collecting cone, closed at the top by an extension of the flat abutment area may be provided. This, in effect, is the structure of Figure 5.

The operations described above are no different when the lower orifice is used to deliver syrup coincidentally with the delivery of carbonated water from the top orifice, but with substantial saving of time per drink as compared with the drawing of syrup from a separate source followed by drawing carbonated water into the drink.

Nor is the operation different when drawing beer. By avoiding turbulence the $CO_2$ content is retained to an extent that excessive "head" is not formed and it is possible to draw a glass continuously.

We claim:

1. In means for delivering carbonated liquids with a minimum loss of gas, a discharge duct having a relatively restricted discharge aperture, an abutment having a receiving surface generally perpendicular to and in the line of delivery of the jet delivered by said aperture, and a collecting element surrounding said abutment and extending from the plane of the abutment toward and about the end of the duct, said collecting element having a circumferential wall surrounding said duct and terminating in a discharge orifice the junction between said collecting element and said circumferential wall being curvilinear in radial section, an additional duct adapted to deliver a jet directly through said discharge orifice, and valve means for said ducts.

2. In a draft arm for the dispensation of carbonated liquids, a draft head having an inwardly concave dome shaped top and a conic delivery portion extending downwardly and inwardly from said top, and terminating in a bottom opening, a delivery duct, including an end portion having a delivery aperture aligned with the center of said dome shaped top, a second delivery duct having a delivery aperture aligned with the center of said bottom opening, a two way valve structure for said delivery passages including a valve member adapted alternatively to deliver liquid to each said duct, and manually controllable means for actuating said valve member.

3. In a draft arm structure, a plurality of liquid carrying ducts having terminal portions lying along a single axis but facing in opposite directions along said axis, each said terminal portion having a restricted jet creating discharge aperture, a dome-shaped receiving element in the line of jet delivery of liquid from the upper orifice, said receiving element having an abutment area positioned generally perpendicular to the path of the jet, and having a collecting area surrounding said abutment area, said abutment area and said collecting area being substantially curvilinear in radial cross-section, said collecting area of the receiving element terminating in a discharge orifice, and valve means effective to open either of said ducts.

PAUL D. VAN VLIET.
BARTELL J. HOMKES.

REFERENCES CITED

The following references are of record in the file of this patent:

UNITED STATES PATENTS

| Number | Name | Date |
| --- | --- | --- |
| 229,304 | Clark | June 29, 1880 |